(12) United States Patent
Selvakumar

(10) Patent No.: US 11,604,962 B2
(45) Date of Patent: Mar. 14, 2023

(54) METHOD AND SYSTEM FOR TRAINING A MACHINE LEARNING SYSTEM USING CONTEXT INJECTION

(71) Applicant: Genpact Luxembourg S.à r.l. II, Luxembourg (LU)

(72) Inventor: Prakash Selvakumar, Bangalore (IN)

(73) Assignee: Genpact Luxembourg S.à r.l. II, Luxembourg (LU)

(*) Notice: Subject to any disclaimer, the term of this patent is extended or adjusted under 35 U.S.C. 154(b) by 428 days.

(21) Appl. No.: 16/840,159

(22) Filed: Apr. 3, 2020

(65) Prior Publication Data

US 2020/0356838 A1 Nov. 12, 2020

Related U.S. Application Data

(60) Provisional application No. 62/845,669, filed on May 9, 2019.

(51) Int. Cl.
*G06N 3/04* (2006.01)
*G06K 9/62* (2022.01)
*H04L 51/02* (2022.01)
*G06N 3/08* (2023.01)

(52) U.S. Cl.
CPC ......... *G06N 3/0445* (2013.01); *G06K 9/6256* (2013.01); *G06N 3/0481* (2013.01); *G06N 3/08* (2013.01); *H04L 51/02* (2013.01)

(58) Field of Classification Search
CPC ...... G06N 3/0445; G06N 3/0481; G06N 3/08; G06N 3/006; G06N 3/0454; G06K 9/6256; H04L 51/02

USPC .......................................................... 706/16
See application file for complete search history.

(56) References Cited

U.S. PATENT DOCUMENTS

| 11,270,084 | B2* | 3/2022 | Ramamurti | G06F 40/284 |
| 2018/0285348 | A1 | 10/2018 | Shu et al. | |
| 2018/0329884 | A1 | 11/2018 | Xiong et al. | |
| 2019/0228297 | A1* | 7/2019 | Shen | G06N 3/08 |

OTHER PUBLICATIONS

PCT/EP2020/062949—International Search Report and Written Opinion, dated Aug. 3, 2020.
Kirthevasan Kandasamy, et al., "Batch Policy Gradient Methods for Improving Neural Conversation Models," Arxiv.org., Cornell University Library, 201 Olin Library, Feb. 10, 2017, XP080747453.

(Continued)

*Primary Examiner* — Juan A Torres
(74) *Attorney, Agent, or Firm* — Goodwin Procter LLP

(57) ABSTRACT

A method and a system are provided for training a machine-learning (ML) system to function as a chatbot. According to one embodiment, a method for training and ML system includes providing to the machine-learning system: in a first iteration, a first input-output pair that includes a first input and a first output; and, in a second iteration, a second input-output pair that includes a second input and a second output, where the second input includes the first input-output pair and the second output is different from the first output, so that a context for the second input-output pair is stored in the memory of the ML system.

26 Claims, 10 Drawing Sheets

(56) References Cited

OTHER PUBLICATIONS

Gary Ren, et al., "Conversational Query Understanding Using Sequence to Sequence Modeling," Proceedings of the 2018 World Wide Web Conference on World Wide Web, WWW '18, Jan. 1, 2018, pp. 1715-1724, XP055591304, New York.

Liu Yang, et al., "A Hybrid Retrieval-Generation Neural Conversation Model," arxiv.org, Cornell University Library, 201 Olin Library Cornell University Ithaca, NY 14853, Apr. 19, 2019, XP081468832.

Oswaldo Ludwig, "End-to-end Adversarial Learning for Generative Conversational Agents," arxiv.org, Cornel University Library, Ithaca, NY, 14853, Nov. 28, 2017, XP081308296.

\* cited by examiner

| Line No | Chat message |
|---|---|
| 1 | Bot: Good morning. How can I help you? |
| 2 | Customer: I want to book ticket for movie xyz |
| 3 | Bot: For which theater, date and time? |
| 4 | PM |
| 5 | Bot: Ticket booked, details are sent to your Email. Booking number: AB7034567 |
| 6 | Customer: Thank you |
| 7 | Bot: Any other help you require? |
| 8 | Customer: Can you order pizza for me? |
| 9 | Bot: Done, you will receive SMS for confirmation |
| 10 | Customer: Ok, Thanks  Refers |
| 11 | Bot: Any other help you require? |
| 12 | Customer: Cancel AB7034567 now |

1) Customer asked to AB7034567. He does not give any information to agent
2) Line 12 points to line 5.
3) Agent understands if if he looks at line 5.
4) RNN has the capability of looking at the previous data in the sequence.

FIG. 14

METHOD AND SYSTEM FOR TRAINING A MACHINE LEARNING SYSTEM USING CONTEXT INJECTION

CROSS-REFERENCE TO RELATED APPLICATIONS

This application claims priority to and benefit of U.S. Provisional Patent Application No. 62/845,669, entitled "Method and System for Context Injection in a Neural Chat System," filed on May 9, 2019, the entire contents of which are incorporated herein by reference.

FIELD

This disclosure generally relates to machine learning techniques and, in particular, to training and use of machine learning systems based on sequence-to-sequence models.

BACKGROUND

A machine learning system based on a sequence-to-sequence model can receive one sequence of characters, numbers, combinations of characters and numbers, words, etc., and can produce another sequence. For example, such a system can be used to translate a sentence or a question in one language (i.e., a sequence of words) into a sentence or a question in another language (i.e. another sequence). Such a machine learning system can also be designed to operate as a chatbots that can converse with users with the goal of mimicking a conversation between the user and another human.

Many chatbots that are available today are usually notable to mimic a conversation between two humans. The users often find the conversation unnatural, and believe that the chatbots do not understand the users' questions and/or do not produce a meaningful response.

SUMMARY

Methods and systems for training a machine learning system so that it can mimic a conversation between two humans are disclosed. According to one embodiment, a method for training a machine-learning system includes providing to the machine-learning system: in a first iteration, a first input-output pair that includes a first input and a first output; and, in a second iteration, a second input-output pair that includes a second input and a second output, where the second input includes the first input-output pair and the second output is different from the first output, so that a context for the second input-output pair is stored in a memory of the machine-learning system.

BRIEF DESCRIPTION OF THE DRAWINGS

The present embodiments will become more apparent in view of the attached drawings and accompanying detailed description. The embodiments depicted therein are provided by way of example, not by way of limitation, wherein like reference numerals/labels generally refer to the same or similar elements. Indifferent drawings, the same or similar elements may be referenced using different reference numerals/labels, however. The drawings are not necessarily to scale, emphasis instead being placed upon illustrating aspects of the present embodiments. In the drawings:

FIG. 14 an example use of a machine learning system trained using context injection.

DETAILED DESCRIPTION

The following disclosure provides different embodiments, or examples, for implementing different features of the subject matter. Specific examples of components and arrangements are described below to simplify the present disclosure. These are, of course, merely examples and are not intended to be limiting.

Figure 1:
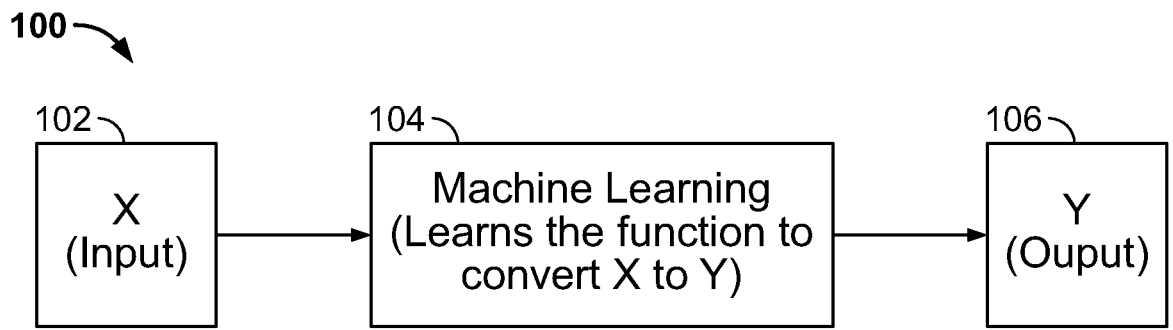
FIG. 1 schematically depicts the training of a typical machine-learning system, and subsequent use of the system.

FIG. 1 schematically depicts the training of a typical machine-learning system 100, and subsequent use of the system. In particular, supervised machine learning is a process used to learn patterns from data, where the machine learning process 104 derives a function $f$ that yields the expected output Y, 106, from input X, 102. During the training phase, the machine is supplied with a set of various inputs X for which the corresponding set of correct outputs Y is known. For each input in the set X, called a training set, a positive (or negative) feedback may be provided to the machine when it generates the correct (or incorrect) output. Based on this feedback, the machine tweaks the function $f$ until it can correctly generate the outputs for at least a certain fraction of the inputs in the set X.

Another set of inputs, called a validation set, for which also the corresponding correct outputs are known, may then be used to test if the machine is, in fact, generating the expected outputs at least for a certain fraction of the validation set. Once validated, the machine can be supplied with an input X for which the correct output is not known. A property trained machine would then produce the correct output Y at a high probability (e.g., 0.5, 0.6, 0.75, 0.8, or more).

In theory, the correct output Y can be expressed in terms of the input X as $Y=f^*(X)$, where $f^*$ is an unknown function. Through the training, the machine learning system learns a function $f$ that is a close approximation of the function $f^*$. It is rare for data to have a clear pattern that allows the machine learning system to learn the unknown function perfectly, i.e., $f=f^*$. For this reason, an error (e) component is calculated by the machine learning system when inferring Y from X. Therefore the equation $Y=f^*(X)$ can be written as $Y=f(X)+e$. The error (e) can be noise in the data or may account for the situation where the relationship between X and Y itself is not clearly or mathematically explainable. Formally stated, there may not be a closed form relationship between X and Y, and $f^*$ is hypothetical.

Figure 2:
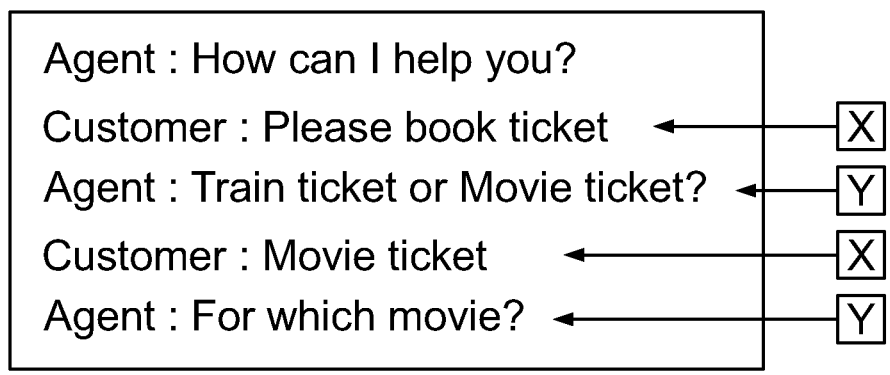
FIG. 2 illustrates example inputs and outputs of a machine-learning system designed to function as a chatbot.

FIG. 2 illustrates example inputs (X) and outputs (Y) of a machine-learning system designed to function as a chatbot, i.e., a computer program that mimics the actions of a human communicating with another human. In other words, a chatbot is a computer program that can converse with a human using text and/or audio responses.

Training Corpus:

In the context of a chatbot, the training corpus is a collection of text used to train a machine learning system of the chatbot. The training corpus generally contains validated linguistic information that is attributed to the original text. The training corpus is typically used by machine-learning systems to create a statistical model of the input text. In addition, the training corpus can be used to check the accuracy of rule-based programs. Statistical programs can use a rule-based model developed using the training corpus, for analyzing new, unknown text.

Sigmoid Function:

Many problems solved using machine learning provide a probability estimate as an output. With neural network models such as regular deep feedforward networks and convolutional neural networks, for classification tasks over some set of class labels the output, for example y=[0.02, 0, 0.005, 0.975], may be interpreted as the probability that some input x belongs to each of the different classes is equal to the respective component values y; in the output vector y. In this example, the probability that input x belongs to classes A, B, and C, respectively, is 0.02, 0.005, and 0.975. Thus, it is highly likely that the input x belongs to Class C.

Logistic regression is an efficient mechanism for calculating such probabilities. The returned probability may be used on an "as is" basis, or may be converted into a binary category. As an example, a certain logistic regression model predicts the probability that a dog will bark during the middle of the night: p(bark|night). If the logistic regression model predicts a value p(bark|night) of 0.05, that value may be used "as is." Using this value, it can be determined that over a year, the dog's owners should be startled awake approximately 18 times. This is computed as:

Startled=$p$(bark|night)*nights

18⁻=0.05*365

Figure 3:
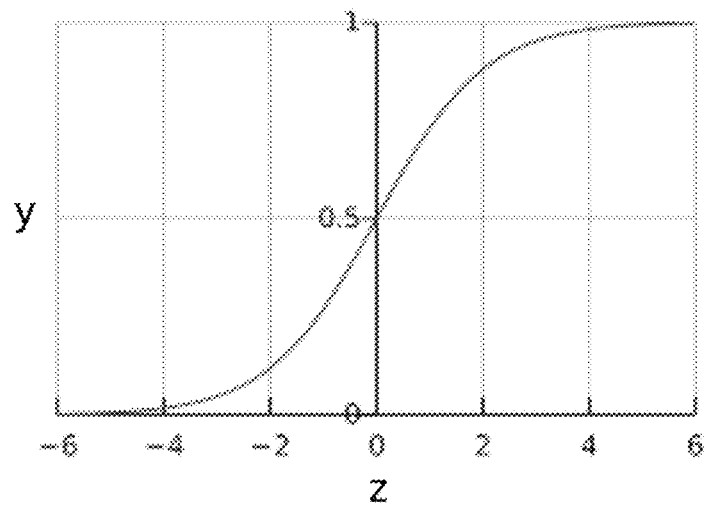
FIG. 3 depicts an example sigmoid function.

Logistic regression is used as an activation function in an artificial neural network (ANN). A logistic regression model can ensure that the output always falls between 0 and 1. A sigmoid function produces output having the same characteristics, i.e., an output that falls between 0 and 1, as depicted in FIG. 3. A typical sigmoid function is written as:

$$y = \frac{1}{1+e^{-z}}$$

With reference to FIG. 3, if z represents the output of the linear layer (an internal layer) of a machine learning model trained with logistic regression, then sigmoid(z) would yield a value (a probability) between 0 and 1, given by:

$$y' = \frac{1}{1+e^{-(z)}}$$

where:
y' is the output (can be internal) of the logistic regression model for a particular example;

$$z=b+w_1x'_1+w_2x'_2+ \ldots w_Nx'_N;$$

The w values are the model's learned weights, and b is the bias; and

The x' values are the feature values related to one or more inputs x.

Figure 4:
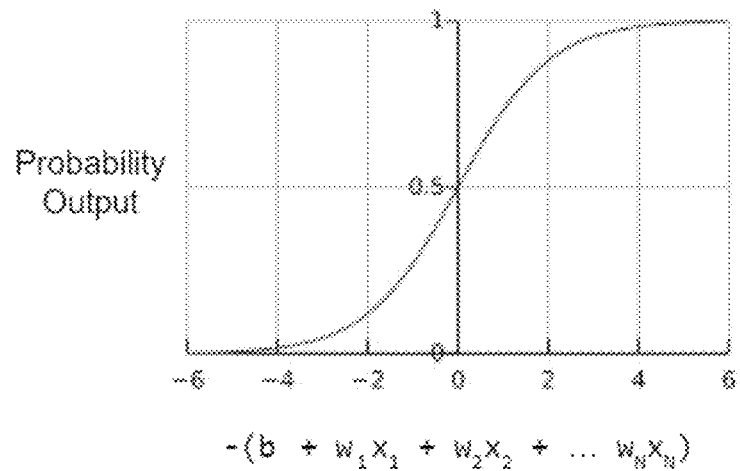
FIG. 4 depicts an example sigmoid function in terms of weights and features of a machine learning system.

An example sigmoid function in terms of the weights (w) derived by a machine learning system and the feature values (x') is depicted in FIG. 4. Note that z is also referred to as the log-odds because the inverse of the sigmoid states that z can be defined as the log of the probability of the "1" label (e.g., "dog barks" in the example above) divided by the probability of the "0" label (e.g., "the dog does not bark"), and is written as:

$$z = \log\left(\frac{y}{1-y}\right)$$

Word Embedding:

Word embedding is a representation of document vocabulary. It captures one or more properties of the word, e.g., the context of a word in a document, semantic and syntactic similarity, relation with other words, etc. Word embedding typically allows words with similar meaning to have a similar representation. They are a distributed representation for the text, and are used for implementing deep learning methods on challenging natural language processing problems. Word embedding methods learn a real-valued vector representation for a predefined fixed sized vocabulary from a corpus of text. The learning process may be joined with the neural network model in some cases, such as document classification, or it can be an unsupervised learning process that uses document statistics. The words may be processed further using a recurrent neural network.

Recurrent Neural Network:

A recurrent neural network (RNN) is a type of artificial neural network typically used in speech recognition and natural language processing (NLP). RNNs can recognize a data's sequential characteristics, and use the detected patterns to predict the next likely scenario. RNNs may be used when context is important for predicting an outcome. RNNs are different from other types of artificial neural networks in that they use feedback loops to process a sequence of data in deriving the final output, which can also be a sequence of data. These feedback loops allow information to persist within the system. This effect is often described as memory.

To illustrate, consider the sequences of data: x={$x_1$, $x_2$, ..., $x_T$}, y={$y_1$, $y_2$, ..., $y_1$}. The values x and y have the following relation $h_t=g1(x_t, h_{t-1})$; $y_t=g_2(h_t)$, where $g_1$ and $g_2$ are some arbitrary functions. This means that the current output y depends on the current state $h_t$ of the machine learning model. Also the state $h_t$ is calculated using the current input $x_t$ and the previous state of the model $h_{t-1}$. The state $h_{t-1}$ represents information about the previous inputs observed in the history by the model.

A feed-forward neural network is represented by the relation: $y_t=f(x_t; \Theta)$. Here, $y_t$ is the predicted output for some input $x_t$, and $\Theta$ indicate the parameters of the function or the model that yields an output $y_t$ given an input $x_t$. A feed-forward neural network produces $\{y_1, y_2, \ldots, y_t\}$ one at a time, by taking $\{x_1, x_2, \ldots, x_t\}$ as inputs, respectively. For a time-series problem, the predicted output $y_t$ at time t of a feed-forward neural network depends only on the current input $x_t$. In other words, the model does not have or at least does not retain any knowledge about the inputs that led to $x_t$, i.e., $\{x_1, x_2, \ldots, x_{t-1}\}$. For this reason, a feed-forward neural network will generally fail at a task where the current output not only depends on the current input but as also on one or more of the previous inputs.

For example, consider an artificial neural network used to predict the missing words in a sentence: "James had a cat and it likes to drink _____." Processing one word at a time and using a feed-forward neural network, only the last or current input, i.e., the word "drink," is not enough to predict the next work. At least a part of the reason is, the current input, by itself, is not enough understand the whole phrase or to understand the context, and the word drink can appear in many different contexts. Processing the full sentence at a single go by an ANN or a machine-learning system, in general, can become impractical for very long sentences because excessive amounts of processing time and/or capacity and/or memory may be needed.

Modeling with Recurrent Neural Networks:

An RNN may be used to find a solution in such cases. Starting with the data sequences: $x=\{x_1, x_2, \ldots x_T\}$, $y=\{y_1, y_2, \ldots, y_T\}$, assume the following relationship:

$$h_t = g_1(x_t, h_{t-1})$$

$$y_t = g_2(h_t)$$

Now, replace $g_1$ with a function approximator $f_1(x_t, h_{t-1}; \Theta)$ that parametrized by the parameter set $\Theta$, and that takes the current input $x_t$ and the previous state of the system $h_{t-1}$ as inputs and produces the current state $h_t$. Then, $g_2$ is replaced with another function approximator $f_2(h_t; \varphi)$ that is parameterized by the parameter set $\varphi$, and that takes as input the current state of the system $h_t$ to produce the output $y_t$. The above relationships can then be written as:

$$h_t = f_1(x_t, h_{t-1}; \Theta)$$

$$Y_t = f_2(h_t; \varphi)$$

The dot product of the approximate functions $f_1$ and $f_2$ is an approximation of the true model that generates y from x. Therefore, the equations above may be combined as follows:

$$y_t = f_2(f_1(x_t, h_{t-1}; \Theta); \varphi)$$

For example, $y_4$ can be expressed as:

$$y_4 = f_2(f_1(x_4, h_3; \Theta); \varphi)$$

Also, by expansion, the following equation results (where the parameter sets $\Theta$ and $\varphi$ are omitted for clarity):

$$y_4 = f_2(f_1(x_4, f_2(f_1(x_3, f_2(f_1(x_2, f_2(f_1(x_1, h_o))))))))$$

Figure 5:
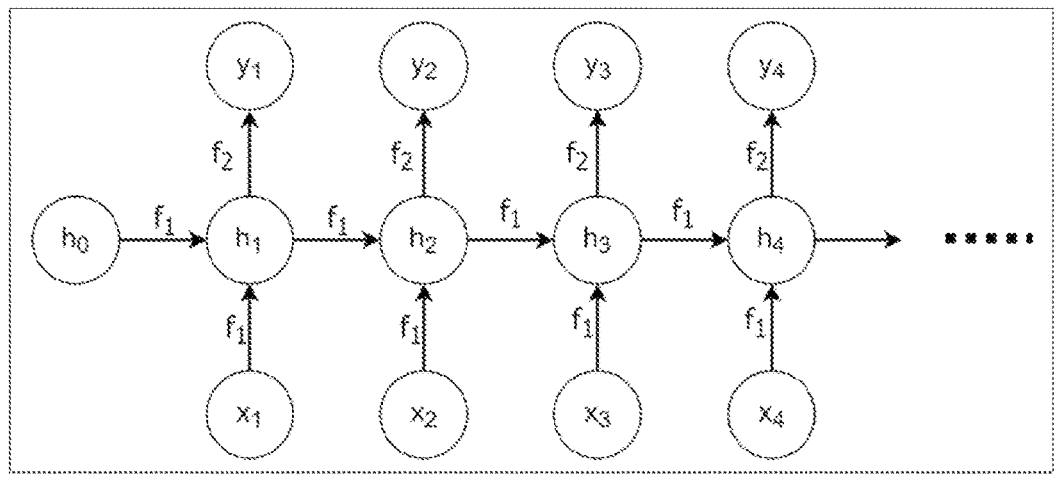
FIG. 5 schematically depicts an example recurrent neural network (RNN)

FIG. 5 schematically depicts the computation of $y_4$, where the function $f_1$ is applied to the state $h_0$ and the input $x_1$ to yield the state $h_1$. The function $f_2$ is then applied to the state $h_1$ to yield the output $y_1$. These process steps are then repeated, i.e., the function $f_1$ is applied to the state $h_1$ and the input $x_2$ to yield the state $h_2$, and so on, and the function $f_2$ is applied to the state $h_2$ to yield the output $y_2$ and so on, ultimately yielding $y_4$.

If the approximate functions $f1$ and $f2$ are applied to each and every input $x_i$, the RNN can become very large and its performance, in terms of processing time, required processing capacity, and/or required memory can degrade. Given a large enough input sequence $x=\{x_1, x_2, \ldots x_T\}$, where T is greater than 10, 25, 40, 100, or greater, it may become impractical or infeasible to compute the output sequence $y=\{y_1, y_2, \ldots, y_T\}$. It should be understood that while the sequences x and y can be of the same length, they can be of different lengths also.

Long Short-Term Memory (LSTM):

LSTM is an artificial recurrent neural network architecture that is used in the field of deep learning. Unlike the standard feed-forward neural networks, an LSTM has feedback connections that can make it Turing machine. It can not only process single data points (such as images, samples of speech, words in a text, etc.), but also entire sequences of data (such as video, speech, or conversations). An LSTM can accomplish this while avoiding the above-described performance problems of a regular RNN.

To do this, an LSTM can discriminate between relatively more important and relatively less important learned information, and may remember only the relatively more important information and may forget the relatively less or unimportant information. For example, if you ask an average movie fan, who has seen the trailer of a new movie to be released, to repeat the trailer word-for-word, s/he would likely not be able to that, but the movie fan would most likely remember the release date. In various embodiments, a LSTM may be trained similarly to discriminate between less and more important information, and to forget the information deemed less important. Therefore, an LSTM can be used to perform tasks such as unsegmented, connected handwriting recognition or speech recognition.

In general, given an input sequence of words, an LSTM-based ANN can produce an output sequence of words, where the input and output sequences can be of the same or different lengths. The ANN can be trained to produce a meaningful response to the input sequence. In some embodiments, if LSTMs are used for the encoder part of an ANN used to implement a chatbot, LSTMs are used for the decoder part of the ANN, as well. The output words for the conversation are predicted from the hidden state of the decoder. This prediction takes the form of a probability distribution over the entire output vocabulary. If there is a vocabulary of 50,000 words, then the prediction is a 50,000 dimensional vector, with each element corresponding to the probability predicted for one word in the vocabulary.

Figure 6:
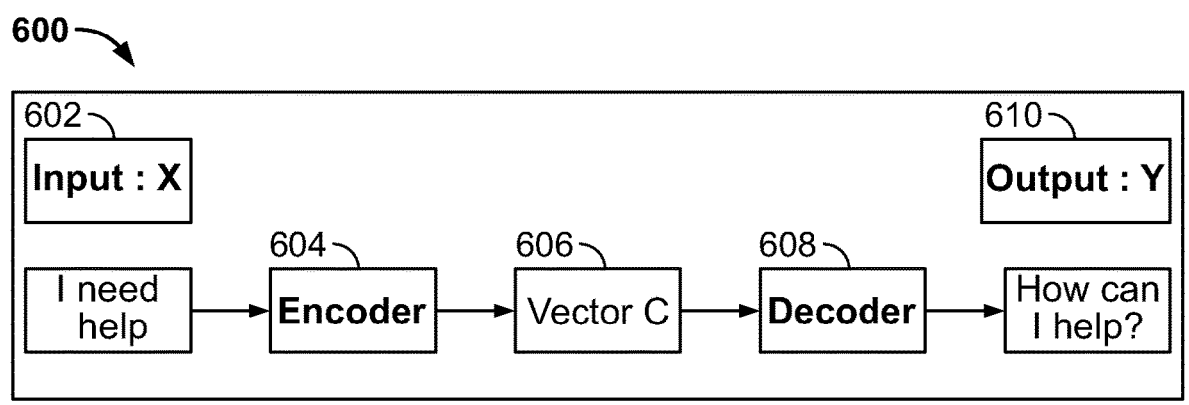
FIG. 6 is a block diagram of an exemplary context injection system, according to one embodiment.

FIG. 6 is a block diagram of an exemplary context injection system 600, according to one embodiment. The input sequence X, 602 ("I need your help") is received by the encoder 604, which generates a full context 606 (also called the context vector "C") for the entire input sequence 602. In the inference mode, the decoder 608 receives the full context 606, and produces a response, i.e., the output sequence Y, 610 ("How can I help?"). In the training mode, both the full context 606 and the expected response, i.e., output sequence Y, 610 are provided as inputs to the decoder, using which the decoder can derive the parameters, e.g., weights, for its approximation function. The context vector C, 606, is learnt by the ANN that forms the encoder and, in the inference mode, the ANN of the decoder 608 uses the context vector C, 606, to predict a reply, i.e., output sequence Y, 610 to the input sequence X, 602.

The ANN's in both the encoder 604 and the decoder 608 can be RNNs or LSTMs. In some embodiments, the either or both ANNs are single-layer ANNs and in other embodiments, either or both ANNs are multi-layer ANNs. The ANNs of the encoder 604 and the decoder 608 may be collectively referred to as the ANN of a context injection system, which can operate as a chatbot in some embodiments.

Figure 7:
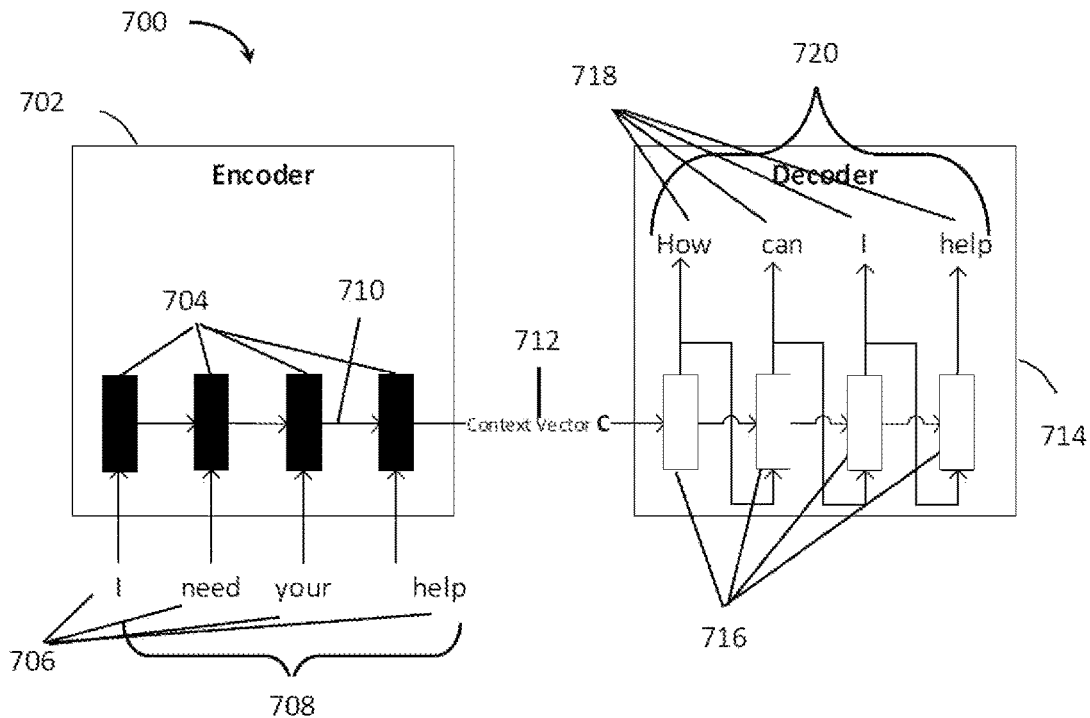
FIG. 7 illustrates the encoder and decoder of a context injection system, according to one embodiment.

FIG. 7 illustrates the encoder and decoder of a context injection system 700, according to one embodiment. The encoder 702 includes an encoding unit 704, and each word 706 of the input sequence 708 (e.g., a sentence or a question) is processed by the encoding unit 704 in one respective step. The context information 710 derived from an earlier step is used in the next step, so that the final step produces a context vector 712 for the entire input sequence 708.

In the inference mode, the decoder 714 includes a decoding unit 716 which receives the full context vector 712 in each decoding step. In the first decoding step, the decoding unit 716 generates one word 718 of the output sequence 720. The word 718 is used by the decoding unit 716 in the next step, along with the context vector 712, to output the next word 718, until the entire output sequence 720 is produced.

Figure 8:
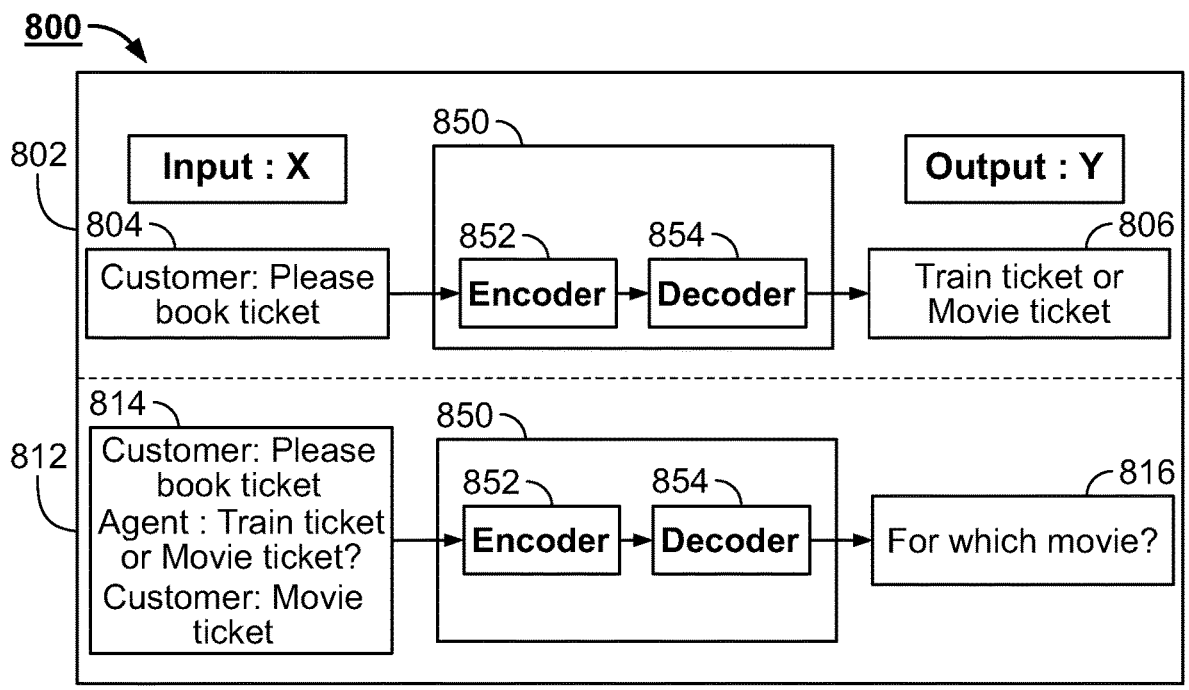
FIG. 8 shows a training process of an artificial neural network (ANN) of a context injection system, according to one embodiment.

FIG. 8 shows the training process 800 of the ANN 850 of a context injection system, according to one embodiment. In general, in several iterations, the ANN 850, which includes the encoder 852 and the decoder 854, is trained to understand entire conversation in an incremental fashion. For example, in Iteration 1, 802, the input X, 804, is: "I want to book a ticket," and the known, correct output Y, 806, is: "Train ticket or movie ticket?" The encoder 852 and the decoder 854 are trained using this pair of input X, 804, and output Y, 806, to generate the respective parameters of the respective ANNs of the encoder 852 and the decoder 854.

In iteration 2, 812, the input X, 814, is not just the next response from the user, but includes the entire conversation up to this point, i.e., the input X, 814, includes three parts, namely, the input sequence X, 804, received in Iteration 802: "I want to book a ticket;" the expected response Y, 806, in the iteration 802: "Train ticket or movie ticket?;" and the subsequent response from the user received in Iteration 812: "Movie ticket." The known, correct output Y, 816, is: "For which movie?" The encoder 852 and the decoder 854 are trained further using the pair of input X, 814, and output Y, 816, to revise the respective parameters of the respective ANNs of the encoder 852 and the decoder 854. This process is continued until the entire conversation is over. In each iteration, the encoder 852 provides to the decoder 854 a representation of the entire input sequence received in that iteration as context vector C.

In some embodiments, the encoder employs a multi-layer LSTM and includes:
An input layer that takes the input sequence (a sentence, a question, or a combination) and passes it to the embedding layer;
An embedding layer, that takes the input sequence and converts each word in the sequence into a fixed size vector;
A first LSTM layer that, in each processing step, takes a vector that represents a word and passes its output to the next layer; and
A final LSTM layer that generally operates as the previous layer but, instead of passing its output, the final LSTM layer passes its state to the decoder.

In these embodiments, the decoder may also employ a multi-layer LSTM and may include:
An input Layer that, during the training mode, takes the target (i.e., the expected) output sequence (a sentence and/or a question) and passes it to an embedding layer;
An embedding layer that takes the target output sentence and converts each word into a fixed size vector;
A first LSTM layer that, in each processing step, takes as input a vector that represents a word of the output sequence and passes its output to the next layer. The state of this layer is initialized to be the last state of the last LSTM layer from the encoder;
A final LSTM layer that processes the output from the previous layer and passes its output to a dense layer; and
A dense layer (also called an output layer), takes the output from the previous layer and outputs a one hot vector representing a respective output word of the target sequence, in each processing step.

In the inference mode, the input layer is not supplied with the target output sequence. Rather, using the selected parameters, the decoder generates, in each processing step of each iteration, a likely output word forming an output sequence. These words may be received by the input layer of the decoder in the next processing step, and are passed to the embedding layer.

Hidden States:

Sequential information derived as the ANN (forming an encoder and a decoder) learns, is preserved in the network's hidden state. The learning can span many time steps as each sentence or question in a conversation is processed word-by-word. In this, the ANN is particularly trained to find relationships between events separated by many moments. Such relationships are called "long-term dependencies," because an event downstream in time may depend upon, and can be a function of, one or more events that occurred before. An RNN can learn such dependencies by adjusting and sharing weights of certain features over time in the hidden states of recurrent network.

In some embodiments, the RNN used encodes words in a sequence from left to right, and the hidden states store the left context of each word, i.e., the hidden state may account for all the preceding words or at least those determined to be important. In some embodiments, the RNN used obtains the right context by processing the words in a sequence from right-to-left or, more precisely, from the end of the sequence to the beginning of the sequence. Two RNNs may be used together in some embodiments, each processing the word sequence in different directions. The combination of the two RNNs is called a bidirectional recurrent neural network.

In some embodiments, the decoder is a recurrent neural network that receives as input a representation of the context vector C generated by the encoder and the previous hidden state, and outputs a word prediction. The decoder also generates a new hidden decoder state, which would be used subsequently to produce a new output word prediction. The first decoder stage uses the last hidden state of the encoder as an input. According to some embodiments, the decoder is formed using a bidirectional recurrent neural network.

In training a machine learning system to operate as a chatbot, one challenge is that the number of steps in the decoder and the number of steps in the encoder can vary with each training sample. Specifically, if each training sample is a distinct pair of chat messages X and Y, such pairs may include sentences or questions of different lengths. As such, the computation graph for each training sample can be different. In some embodiments, computation graphs are dynamically created by unrolling recurrent neural networks. The number of layers an unrolled RNN may include is determined based on an average number of words in the training samples.

Practical training of ANNs used for machine translation generally requires graphics processing units (GPUs) that are well suited for the high degree of parallelism inherent in deep learning models. The high degree of parallelism generally stems from a large number of matrix multiplications involved in machine learning, and various other operations, that can be parallelized, so that the computation time can be minimized using GPUs. A single GPU may provide thousands of cores, while a typical central processing unit (CPU) may provide no more than 12 cores. Although GPU cores are typically slower than CPU cores, they can more than make up for the relatively slow processing speed with their large number of cores and faster memory, because the operations performed by the ANN can be parallelized.

To increase parallelism even more during training, in some embodiments, several prompt-response pairs (e.g., 5, 10, 30, 100, or more pairs) are processed at once. A prompt can be a statement or a sentence, or it can be a question. Likewise, a response (that a human would likely provide, and the chatbot is expected to provide) can also be a sentence or a questions. This implies that the size of one or more state tensors is increased. A tensor is a data structure having at least three dimensions, and is used as a building block of a machine learning chatbot in various embodiments.

For example, in some embodiments, each input word in a particular prompt-response pair is represented by a vector $h_j$. The respective vectors corresponding to a sequence of input words may be stored in a matrix. When a batch of prompt-response pairs is processed, however, the matrices corresponding to each pair may be stacked, forming a three-dimensional tensor. In some embodiments, the decoder hidden state for each output word is a vector. Because several prompt-response pairs in a batch may be processed in parallel, the decoder hidden states can be stored in a matrix. It may not be beneficial to do so, however, for all the output words, because in various embodiments the decoder states are computed sequentially, where the next decoder state depends on the previous decoder state and also on the output word selected by the previous decoder state.

In some embodiments, the machine learning system operating as a chatbot employs deep learning using stacked neural networks. As such, the ANNs forming the encoder and/or decoder include several layers. Each layer includes one or more nodes (also called neurons), where a node combines input data with a coefficient from a set of coefficients (also called set of weights) that either amplify or dampen that input. This operation assigns significance to the different inputs in furthering the task of learning. In other words, the weights determine which input is more helpful than another in classifying or characterizing the input data while minimizing the error in data classification and/or characterization. The input-weight products are summed and the sum is processed by the node's activation function (e.g., a sigmoid function), to determine whether and to what extent the output of the node should progress further through the ANN to affect the ultimate outcome, say, an act of classification or characterization of the input data. If the signal is allowed to passes through, the corresponding node/neuron is said to be activated.

Figure 9:
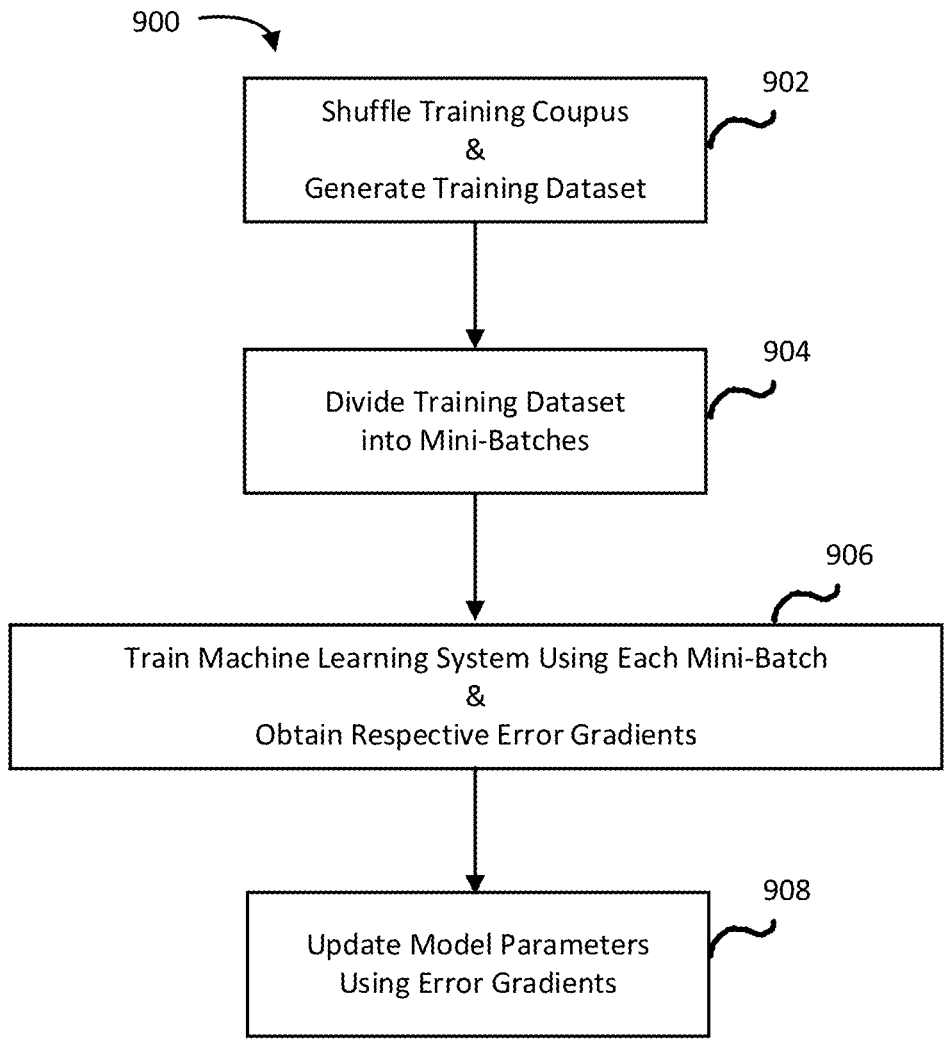
FIG. 9 shows a training process for training a machine learning system, according to one embodiment.

FIG. 9 shows a training process for training a machine learning system, according to one embodiment. The training process 900 begins with shuffling the training corpus, i.e., the entire dataset, to avoid undue biases due to temporal or topical order (step 902). In general, a dataset may be sorted in a specified order (e.g., according to a topic (such as chats about technical problems, chats about travel, chats about health issues, etc.). The overall dataset is usually partitioned into a training dataset and a validation and/or test dataset. If such partitioning is performed without shuffling the overall dataset, different types of data may be selected for different tasks, resulting in unsuccessful training. This problem is mitigated in various embodiments by shuffling the overall data prior to obtaining different subsets of training, validation, and testing.

In step 904, the training dataset is divided into mini-batches, so that the machine learning system does not run out of memory and/or processing capacity during learning, and also does not take excessive time for learning. Dividing the training dataset into mini-batches trades of some learning accuracy for learning efficiency, as described next. In general, each time a new training sample is provided to a machine learning system, the system computes an error between the answer the system generated and the expected or correct answer. The model parameters (e.g., the weights/coefficients of different nodes) may then be adjusted so that the error decreases, along a gradient, so as to approach zero. This technique is referred to as gradient descent.

In general, the more the samples used in determining the error, the more comprehensive the error analysis and, as such, potentially more accurate the determined error. While this can lead to a faster minimization of error during subsequent training, using more samples also requires more processing capacity, memory, and/or computation time, and the machine learning system can run out of the processing capacity and/or memory, and make take excessive processing time (e.g., hours, days, etc.).

In order to avoid such problems, some embodiments employ mini-batch gradient descent, where the training dataset is split into small batches that are used to calculate model error and to update model parameters (e.g., weights or coefficients). Mini-batch gradient descent often finds a balance between the efficiency of stochastic gradient descent (where a batch includes only one sample) and the robustness of batch gradient descent (where the batch includes all the samples in the training dataset).

In step 906, each mini-batch is processed, i.e., the machine learning system is trained to produce the respective expected response to each prompt in the minibatch. The corresponding error gradients are also collected in step 906. In step 908, these gradients are used to update the model parameters, e.g., the weights or coefficients of different nodes in the ANN. In some cases, the gradients across the mini-batches are aggregated, e.g., summed or averaged, and the aggregated gradient is used to update the model parameters.

Typically, training an ANN takes about 5-15 epochs (passes through the entire training corpus). A common stopping criteria is to check the progress of the model on a validation set (that is not part of the training data) and halt when the error on the validation set does not improve, as training further would likely not lead to any further minimization of error and may even degrade performance due to overfitting.

Chatbots are computer programs that are able to converse with users, aiming to mimic a conversation between the user and a human agent. This is especially useful to various service providers, usually to provide answers/solutions to easily addressable questions and issues that customers may have, instead of redirecting those customers to human operators.

One important problem with chatbots is that customers often feel that the chatbots are too unnatural, i.e., they do not respond to customer's requests/questions as a human typically would. As such, users may prefer to talk to a human agent and not to a chatbot, thinking that the chatbot will not be able to answer the users' questions properly. Many chatbots have been trained on a question and answer dataset. Therefore a user's question is mapped to a question in a repository and the answer is retrieved. This answer is given back to the customer by the chatbot without regard to prior questions and responses.

As an example, consider the following conversation:
Bot: Good morning. How can I help you?
Customer: I want to book ticket for movie xyz.
Bot: For which theater, date and time?
Customer: Theater abc, today and 6:00 PM
Bot: Ticket booked, details are sent to your Email. Booking number AB7034567
Customer: Thank you
Bot: Any other help you require?
Customer: Can you order pizza for me?
Bot: Done, you will receive SMS for confirmation
Customer: Ok, Thanks
Bot: Any other help you require?
Customer: Cancel AB7034567 now A conventional chatbot, trained using pairs of single prompt and single response, would not be trained to understand "AB7034567" in the last prompt, because it was not trained to retain any knowledge of what was discussed earlier during the call.

In various embodiments described herein, a machine learning system is trained using not only pairs of single prompt and single response, but using prompts and responses of an entire chat session. Such training may be performed incrementally, e.g., by starting with a pair of single prompt single response, and then using one or more pairs of earlier prompts and responses in conjunction with a pair of new single prompt and single response. The earlier pairs can provide context for the entire conversation and, as such, various embodiments can teach a machine learning system designed to operate as a chatbot to use the context of a chat dialog in producing responses. Such responses may more closely resemble the responses a human agent may provide.

Figure 10:
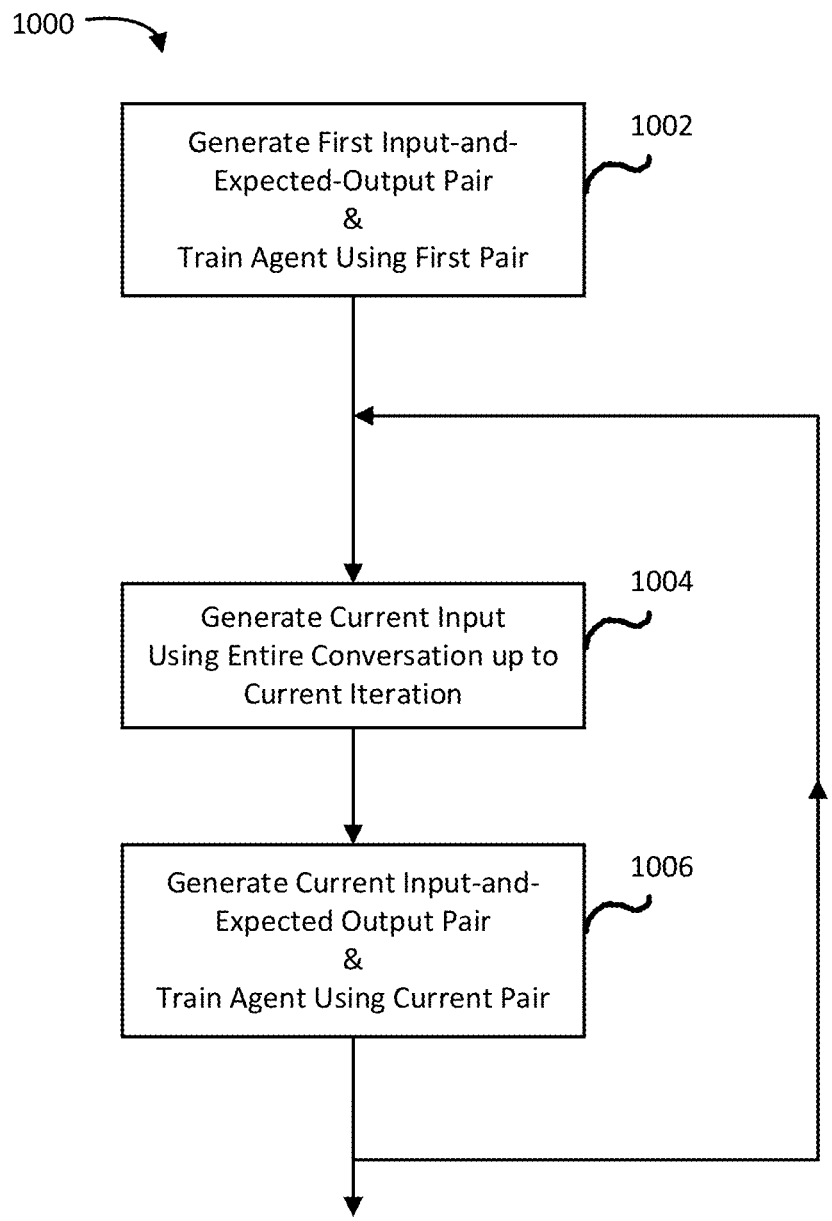
FIG. 10 illustrates an incremental training process, according to one embodiment.
Figure 11:
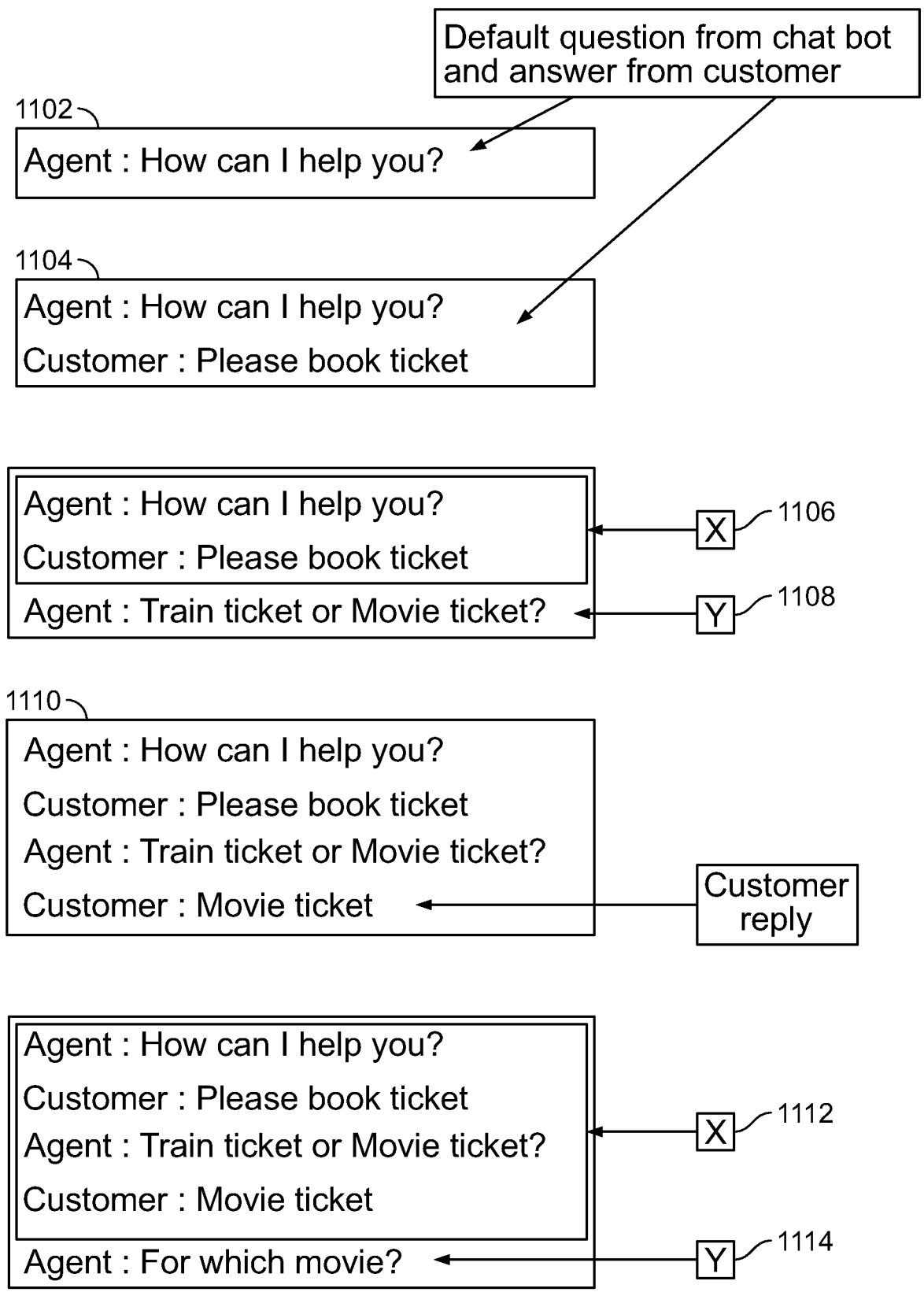
FIG. 11 shows an example of prompts and responses used to train a machine learning system, according to one embodiment.

FIG. 10 illustrates an incremental training process, according to one embodiment. The training process 1000 is described with reference to the prompts and responses shown in FIG. 11. In general, the training process 1000 involves supplying to the machine learning system, in each iteration, an input sequence (denoted $X_j$, for the j-th iteration), and the expected output sequence (denoted $Y_j$, for the j-th iteration). An input $X_j$ may include one or more prompts and/or one or more responses from the previous iterations.

Specifically, in usual operation, the machine learning system (also referred to as "Agent") may begin a conversation by presenting a default question 1102. The user (also referred to as "Customer") may then provide the first prompt "Please book ticket" shown in the combination 1104 of the default question 1102 and the first prompt. At step 1002, corresponding to the first training iteration, the first input-and-expected-output pair 1106 is generated and presented to the Agent. With this pair, the Agent is expected to learn to generate the expected output 1108 ("Train ticket or movie ticket?") in response to the input 1104, which includes the first prompt from the user.

At a current instance of time, i.e., after having been provided the first expected output 1108, the user may provide the current prompt 1110 ("Movie ticket"). The entire conversation up to the current iteration, which includes the first input 1104, the first expected output 1108, and the current prompt 1110, is used to generate the current input 1112 at step 1004, which corresponds to a current training iteration. At step 1006, the current input 1112 and expected output pair 1114 is generated and presented to the Agent. In the current pair, the input is the current input 1112, and the Agent is expected to learn to generate the current expected output 1116 ("For which movie") in response to the current input 1112. As described above, the current input 1112 includes the entire conversation up to the current iteration and, as such, provides a context for the response to be generated by the agent in the current iteration.

The steps 1004 (of generating an input sequence for the current iteration) and 1006 (of generating the current pair of input and expected output to be used in the current iteration and presenting the current pair to the Agent) may be repeated over the entire conversation. It should be understood, that during the training phase the entire conversation would be known. Thus, the process 1000 iteratively updates the input in the input-and-expected-output pairs used for training in different iterations, where the updated input is injected with the available context for the conversation. The Agent is expected to learn this context and use it in generating its response in each iteration.

As one example, the process 1000 may use to train a machine learning system using the prompts and expected reposes from the following entire dialogue:
Agent: Good morning. How can I help you?
Customer: I want to book ticket for movie xyz.
Agent: For which theater, date and time?
Customer: Theater abc, today and 6:00 PM
Agent: Ticket booked, details are sent to your Email.
Customer: Thank you
Agent: Any other help you require today?
Customer: No thanks, Bye
Agent: Bye The inputs, which include user prompts, and expected agent outputs that are used in each training iteration are shown in Table 1 below.

TABLE 1

| | Input-Expected Output Pairs | | |
|---|---|---|---|
| Iter. No. | Input | Expected Agent Output | User Prompt |
| | Good morning. How can I help you? | | I want to book ticket for movie xyz. |
| 1 | Good morning. How can I help you? + I want to book ticket for movie xyz. | For which theater, date and time? | |
| | Good morning. How can I help you? + I want to book ticket for movie xyz. + For which theater, date and time? | | Theater abc, today and 6:00 PM |

TABLE 1-continued

Input-Expected Output Pairs

| Iter. No. | Input | Expected Agent Output | User Prompt |
|---|---|---|---|
| 2 | Good morning. How can I help you? +<br>   I want to book ticket for movie xyz. +<br>     For which theater, date and time? +<br>        Theater abc, today and 6:00 PM | Ticket booked, details are sent to your Email. | |
| | Good morning. How can I help you? +<br>   I want to book ticket for movie xyz. +<br>     For which theater, date and time? +<br>        Theater abc, today and 6:00 PM +<br>           Ticket booked, details are sent to your Email. | | Thank you |
| 3 | Good morning. How can I help you? +<br>   I want to book ticket for movie xyz. +<br>     For which theater, date and time? +<br>        Theater abc, today and 6:00 PM +<br>           Ticket booked, details are sent to your Email. +<br>              Thank you | Any other help you require today? | |
| | Good morning. How can I help you? +<br>   I want to book ticket for movie xyz. +<br>     For which theater, date and time? +<br>        Theater abc, today and 6:00 PM +<br>           Ticket booked, details are sent to your Email. +<br>              Thank you + Any other help you require today? | | No thanks, Bye |
| 4 | Good morning. How can I help you? +<br>   I want to book ticket for movie xyz. +<br>     For which theater, date and time? +<br>        Theater abc, today and 6:00 PM +<br>           Ticket booked, details are sent to your Email. +<br>              Thank you + Any other help you require today? +<br>                  No thanks, Bye | Bye | |

Figure 12:
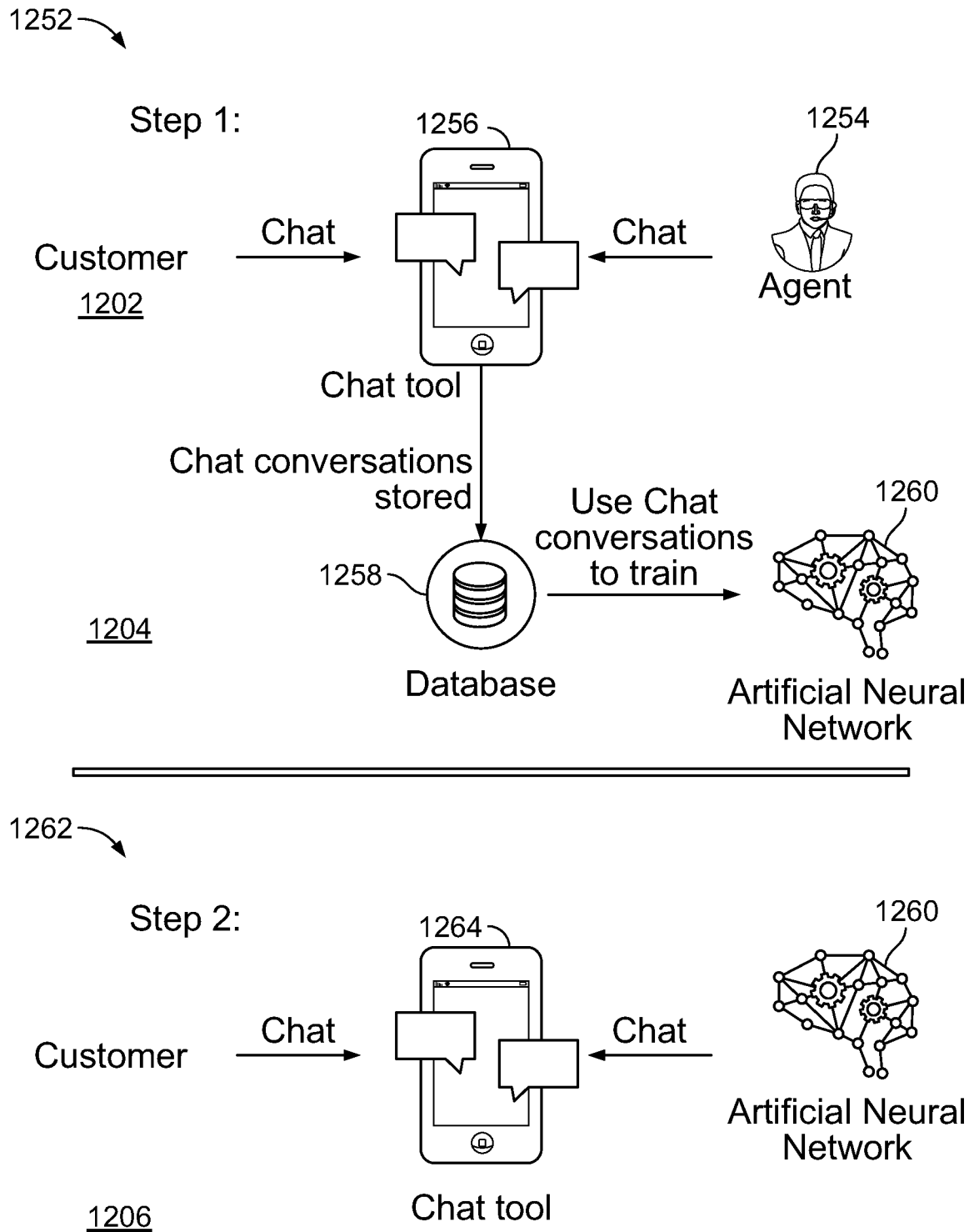
FIG. 12 illustrates the overall use of a machine learning system designed to operate as a chatbot, according to some embodiments.
Figure 13:
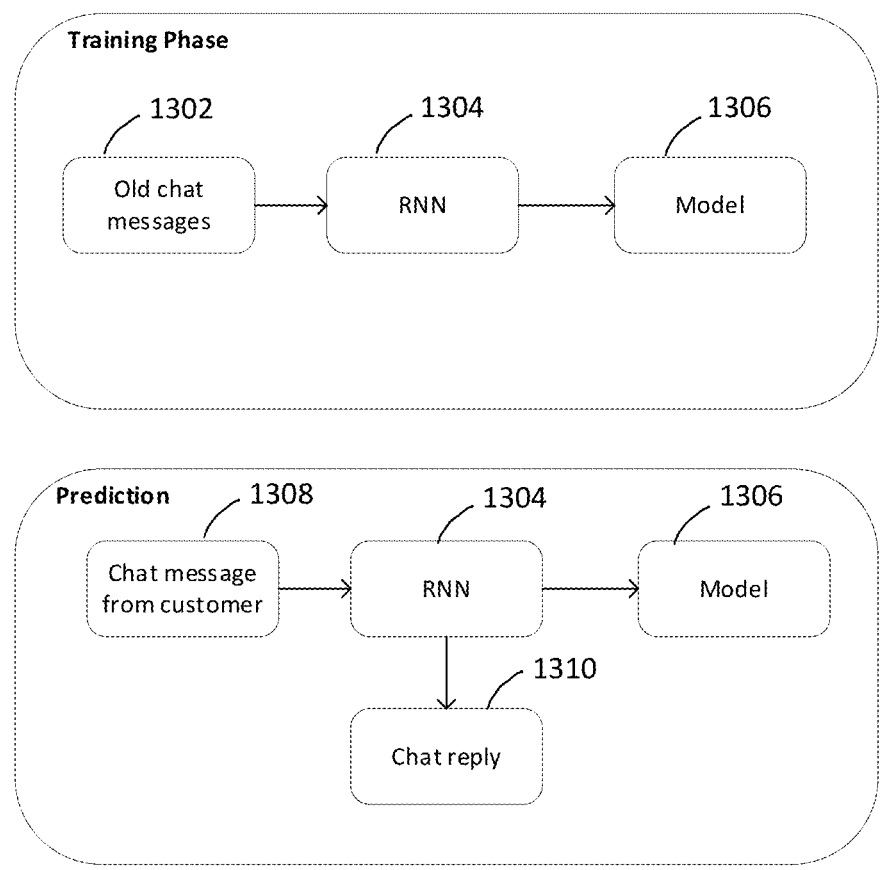
FIG. 13 also illustrates the overall use of a machine learning system designed to operate as a chatbot, according to some embodiments.

FIGS. 12 and 13 illustrate the overall use of a machine learning system designed to operate as a chatbot according to some embodiments. In step 1202, a conversation between a customer 1252 and a human agent 1254, via a user device 1256, is recorded and stored in a database 1258. This conversation data is then used in step 1204, e.g., according to the process 1000 (FIG. 10), for training a machine learning system 1260 (e.g., the system 600 of FIG. 6). Several such conversations may be recorded and used for training, validation, and testing of the system 1260. In step 1206, the trained machine learning system 1260 is deployed, where it may engage in a conversation, e.g., a chat, with another (or the same) user 1262, chatting with the system 1260 using another (or the same) user device 1264 such as a smart phone, tablet computer, laptop, etc.

FIG. 13 similarly shows the use of a machine learning system, an RNN in particular. During the training phase, old chat messages 1302 (that may be collected from instances of users chatting with human agents) are used to train an RNN 1304, which would then derive a sequence-to-sequence model 1306 for mimicking chats between users and human agents. The old chat messages 1302 are processed to generate input-and-expected-output pairs that include context of the chat/conversation. The learned model is stored in the hidden states of the RNN 1304. During the prediction phase, the RNN 1304 receives chat messages 1308 from a user/customer. The chat messages 1304 may include statements and/or questions. The RNN 1304 uses the model 1306 to generate a response to the received chat message 1310, and provides the response (e.g., by displaying, sounding out, etc.) as a chat reply 1310.

FIG. 14 shows a beneficial example use of a machine learning system trained using input-and-expected-out pairs having context included in the inputs. During the chat 1400, at a certain instance of time, the chatbot displayed a message 1402, informing the user that a movie ticket was booked and that the booking number was AB7034567. The chat continued and, at a later time, the user sent a message 1404, requesting cancellation of AB7034567. By itself, the message 1404 does not inform what is to be cancelled. The machine learning system trained using entire conversations generally learns, however, that certain information such as booking numbers, is important, and stores such learned information. After receiving the message 1404, the machine learning system can refer to the information learned earlier during the chat, and respond appropriately. Other information in the chat may be deemed less important and may be forgotten. For example, prior to placing an order for a pizza, the chatbot may ask the user about the preferred toppings, but may forget that information, e.g., to prevent the learned model from becoming so large that it may run out of processing capacity and/or memory. In various embodiments, the context injection system described herein may be used to train any sequence-to-sequence learning processes (e.g., attentional network, etc.).

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated.

What is claimed is:

1. A method for training a machine-learning system, the method comprising:
in a first iteration, providing to a machine-learning system a first input-output pair comprising a first input and a first output, the first output including at least one reply of a first chat conversation;
in a second iteration,
providing to the machine learning system a second input-output pair comprising a second input and a second output, wherein the second input comprises the first input-output pair and the second output is different from the first output, whereby a context for the second input-output pair is stored in a memory of the machine-learning system;
identifying and storing information in the first iteration that is of importance but is unrecognizable in the first iteration; and
referring back to the first iteration when learning the stored information in the second iteration or next iterations.

2. The method of claim 1, further comprising:
repeating the second iteration at least once, wherein in each repetition of the second iteration, the respective second input comprises the second input-output pair from a previous iteration and the respective second output is different from the second output from the previous iteration.

3. The method of claim 2, further comprising:
retrieving the first chat conversation from a chat database;
dividing the first chat conversation into a plurality of prompts and a plurality of replies;
generating the first input-output pair by designating at least one prompt as the first input and the at least one reply as the first output; and
generating the second input-output pair by designating at least one reply, different from the at least one reply designated as the first output, as the second output.

4. The method of claim 3, wherein the second iteration is repeated until all replies in the plurality of replies are supplied as second outputs in respective iterations.

5. The method of claim 4, further comprising:
dividing chat conversations in the chat database into a plurality of batches, wherein a first batch includes the first chat conversation;
retrieving each chat conversation from the first batch;
performing the steps of the method of claim 4 for each retrieved chat conversation;
collecting from the machine learning system error vectors corresponding to all chat conversations in the first batch; and
configuring the machine learning system to adjust one or more parameters thereof using the collected error vectors.

6. The method of claim 5, further comprising:
performing the steps of the method of claim 5 for each batch.

7. The method of claim 5, further comprising:
prior to dividing the chat conversations in the chat database into the plurality of batches, shuffling the chat conversations.

8. The method of claim 1, wherein the machine learning system comprises a recurrent neural network (RNN), and wherein the RNN comprises:
a long short term memory (LSTM) encoder; and
an LSTM decoder.

9. The method of claim 1,
further comprising:
in a third iteration, providing to the machine learning system input consisting of a third input-output pair, the third input-output pair consisting of a third input and a third output, the third input consisting of all previous prompts, all previous replies, and a current prompt of the first chat conversation, the third output consisting of a current reply to the current prompt of the first chat conversation.

10. The method of claim 9, wherein the encoder is implemented using a vector processor.

11. A method for conversing with a user via a machine-learning system, the method comprising:
receiving from a user a current prompt in a conversation; and
providing to the user a current reply in the conversation, via a machine learning system trained to retain and use available context of the conversation, the context being derived from: (i) all previous prompts in the conversation, (ii) the current prompt, and (iii) all previous replies in the conversation, wherein the context comprises previous information other than the previous prompts and replies that was identified and stored as being important but unrecognizable, and wherein providing to the user the current reply is based at least on learning the stored previous information.

12. The method of claim 11, wherein providing the current reply comprises displaying a text message or sounding out a message.

13. The method of claim 11, wherein the machine learning system comprises:
a long short term memory (LSTM) encoder; and
an LSTM decoder.

14. A training system comprising:
a processor; and
a memory in communication with the processor and comprising instructions which, when executed by the processor, program the processor to:
in a first iteration, provide to a machine learning system a first input-output pair comprising a first input and a first output, the first output including at least one reply of a first chat conversation;
in a second iteration,
provide to the machine learning system a second input-output pair comprising a second input and a second output, wherein the second input comprises the first input-output pair and the second output is different from the first output, whereby a context for the second input-output pair is stored in a memory of the machine learning system;
identify and store information in the first iteration that is of importance but is unrecognizable in the first iteration; and
refer back to the first iteration when learning the stored information in the second iteration or next iterations.

15. The training system of claim 14, wherein the instructions further program the processor to:
  repeat the second iteration at least once, wherein in each repetition of the second iteration, the respective second input comprises the second input-output pair from a previous iteration and the respective second output is different from the second output from the previous iteration.

16. The training system of claim 15, wherein the instructions further program the processor to:
  retrieve the first chat conversation from a chat database;
  divide the first chat conversation into a plurality of prompts and a plurality of replies;
  generate the first input-output pair by designating at least one prompt as the first input and the at least one reply as the first output; and
  generate the second input-output pair by designating at least one reply, different from the at least one reply designated as the first output, as the second output.

17. The training system of claim 16, wherein the instructions program the processor to repeat the second iteration until all replies in the plurality of replies are supplied as second outputs in respective iterations.

18. The training system of claim 17, wherein the instructions further program the processor to:
  divide chat conversations in the chat database into a plurality of batches, wherein a first batch includes the first chat conversation;
  retrieve each chat conversation from the first batch;
  perform the operations performed by the training system of claim 17 for each retrieved chat conversation;
  collect from the machine learning system error vectors corresponding to all chat conversations in the first batch; and
  configure the machine learning system to adjust one or more parameters thereof using the collected error vectors.

19. The training system of claim 18, wherein the instructions further program the processor to:
  perform the operations performed by the training system of claim 18 for each batch.

20. The training system of claim 18, wherein the instructions further program the processor to:
  prior to dividing the chat conversations in the chat database into the plurality of batches, shuffle the chat conversations.

21. The training system of claim 14, wherein the machine learning system comprises a recurrent neural network (RNN), and wherein the RNN comprises:
  a long short term memory (LSTM) encoder; and
  an LSTM decoder.

22. The training system of claim 14, wherein the instructions further program the processor to:
  in a third iteration, provide to the machine learning system input consisting of a third input-output pair, the third input-output pair consisting of a third input and a third output, the third input consisting of all previous prompts, all previous replies, and a current prompt of the first chat conversation, the third output consisting of a current reply to the current prompt of the first chat conversation.

23. The training system of claim 22, wherein the encoder is implemented using a vector processor.

24. A computerized conversation system comprising:
  a processor; and
  a memory in communication with the processor and comprising instructions which, when executed by the processor, program the processor to:
  configure the processor as a machine learning system trained to retain and use available context of a conversation between a user and the machine learning system, the context being derived from: (i) all previous prompts in the conversation, (ii) a current prompt, and (iii) all previous replies in the conversation, wherein the context further comprises previous information other than the previous prompts and replies that was identified and stored as being important but unrecognizable;
  receive from the user the current prompt in the conversation; and
  provide to the user a current reply in the conversation, using the available context.

25. The computerized conversation system of claim 24, wherein to provide the current reply, the instructions program the processor to:
  display a text message or sound out a message.

26. The computerized conversation system of claim 24, wherein the processor configured as the machine learning system comprises:
  a long short term memory (LSTM) encoder; and
  an LSTM decoder.

* * * * *